(12) United States Patent
Zhang et al.

(10) Patent No.: US 11,627,539 B2
(45) Date of Patent: Apr. 11, 2023

(54) SYNCHRONIZATION SIGNAL BLOCK GROUPING BASED ON FULL-DUPLEX CAPABILITY

(71) Applicant: QUALCOMM Incorporated, San Diego, CA (US)

(72) Inventors: Qian Zhang, Basking Ridge, NJ (US); Navid Abedini, Basking Ridge, NJ (US); Yan Zhou, San Diego, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/301,922

(22) Filed: Apr. 19, 2021

(65) Prior Publication Data

US 2021/0368459 A1 Nov. 25, 2021

Related U.S. Application Data

(60) Provisional application No. 63/027,693, filed on May 20, 2020.

(51) Int. Cl.
*H04W 56/00* (2009.01)
*H04L 5/14* (2006.01)
*H04W 8/24* (2009.01)
*H04B 17/336* (2015.01)
*H04W 24/10* (2009.01)

(52) U.S. Cl.
CPC ........ *H04W 56/001* (2013.01); *H04B 17/336* (2015.01); *H04L 5/14* (2013.01); *H04W 8/24* (2013.01); *H04W 24/10* (2013.01)

(58) Field of Classification Search
CPC .............................. H04W 24/10; H04B 12/336
See application file for complete search history.

(56) References Cited

U.S. PATENT DOCUMENTS

| | | | |
|---|---|---|---|
| 2020/0052753 A1* | 2/2020 | Raghavan | H04B 7/0695 |
| 2020/0052775 A1* | 2/2020 | Nam | H04B 17/336 |
| 2021/0367651 A1 | 11/2021 | Zhang et al. | |

OTHER PUBLICATIONS

International Search Report and Written Opinion—PCT/US2021/070430—ISA/EPO—dated Jul. 13, 2021.

\* cited by examiner

*Primary Examiner* — Sulaiman Nooristany
(74) *Attorney, Agent, or Firm* — Danai Nelisile Mhembere; Harrity & Harrity, LLP

(57) ABSTRACT

Various aspects of the present disclosure generally relate to wireless communication. In some aspects, a first wireless node (e.g., a user equipment) may receive, from a second wireless node (e.g., a base station), a downlink signaling message indicating a synchronization signal block (SSB) grouping based at least in part on a full-duplex capability and transmission directions associated with the second wireless node. The first wireless node may configure, and the second wireless node may perform, a beam search and/or a self-interference measurement to identify at least one candidate downlink and uplink beam pair suitable for full-duplex operation based at least in part on the SSB grouping. Numerous other aspects are provided.

30 Claims, 8 Drawing Sheets

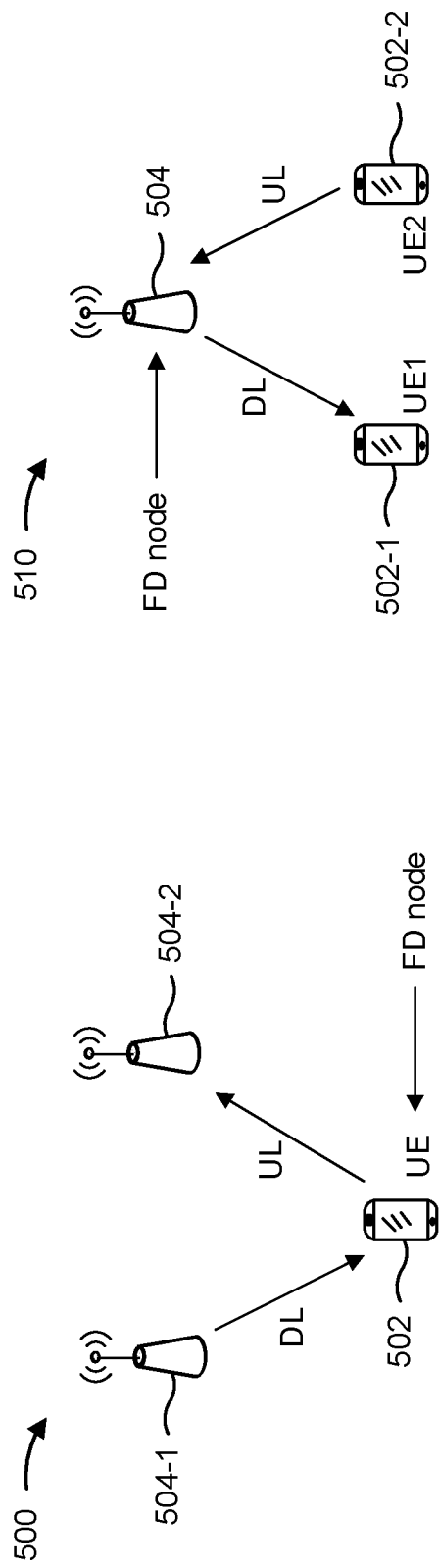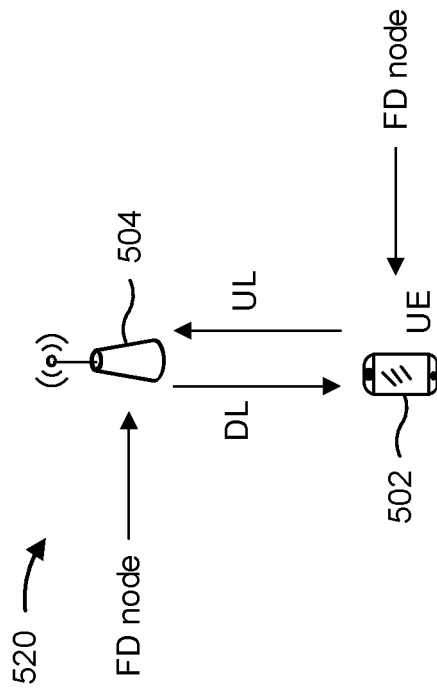

SYNCHRONIZATION SIGNAL BLOCK GROUPING BASED ON FULL-DUPLEX CAPABILITY

CROSS-REFERENCE TO RELATED APPLICATION

This patent application claims priority to U.S. Provisional Patent Application No. 63/027,693, filed on May 20, 2020, entitled "SYNCHRONIZATION SIGNAL BLOCK GROUPING BASED ON FULL-DUPLEX CAPABILITY," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses associated with synchronization signal block (SSB) grouping based on a full-duplex capability.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

For example, full-duplex communication may provide improvements in LTE, NR, and other radio access technologies by enabling contemporaneous uplink and downlink communication by a single wireless device using the same resources. Full-duplex communication may provide a reduction in latency, enhanced spectral efficiency per cell or per UE, and more efficient resource utilization.

SUMMARY

In some aspects, a method of wireless communication, performed by a wireless node, may include: receiving, from another wireless node, a downlink signaling message indicating a synchronization signal block (SSB) grouping based at least in part on a full-duplex capability and transmission directions associated with the other wireless node; and performing at least one of a beam search or a self-interference measurement to identify at least one candidate downlink and uplink beam pair suitable for full-duplex operation based at least in part on the SSB grouping.

In some aspects, a method of wireless communication, performed by a wireless node, may include: transmitting, to another wireless node, a downlink signaling message indicating an SSB grouping based at least in part on a full-duplex capability and transmission directions associated with the wireless node; and configuring at least one of a beam search or a self-interference measurement to identify at least one candidate downlink and uplink beam pair suitable for full-duplex operation based at least in part on the SSB grouping.

In some aspects, a wireless node for wireless communication may include a memory and one or more processors operatively coupled to the memory. The memory and the one or more processors may be configured to: receive, from another wireless node, a downlink signaling message indicating an SSB grouping based at least in part on a full-duplex capability and transmission directions associated with the other wireless node; and perform at least one of a beam search or a self-interference measurement to identify at least one candidate downlink and uplink beam pair suitable for full-duplex operation based at least in part on the SSB grouping.

In some aspects, a wireless node for wireless communication may include a memory and one or more processors operatively coupled to the memory. The memory and the one or more processors may be configured to: transmit, to another wireless node, a downlink signaling message indicating an SSB grouping based at least in part on a full-duplex capability and transmission directions associated with the wireless node; and configure at least one of a beam search or a self-interference measurement to identify at least one candidate downlink and uplink beam pair suitable for full-duplex operation based at least in part on the SSB grouping.

In some aspects, a non-transitory computer-readable medium may store one or more instructions for wireless communication. The one or more instructions, when executed by one or more processors of a wireless node, may cause the one or more processors to: receive, from another wireless node, a downlink signaling message indicating an SSB grouping based at least in part on a full-duplex capability and transmission directions associated with the other wireless node; and perform at least one of a beam search or a self-interference measurement to identify at least one candidate downlink and uplink beam pair suitable for full-duplex operation based at least in part on the SSB grouping.

In some aspects, a non-transitory computer-readable medium may store one or more instructions for wireless communication. The one or more instructions, when executed by one or more processors of a wireless node, may cause the one or more processors to: transmit, to another wireless node, a downlink signaling message indicating an SSB grouping based at least in part on a full-duplex capability and transmission directions associated with the wireless node; and configure at least one of a beam search or a self-interference measurement to identify at least one candidate downlink and uplink beam pair suitable for full-duplex operation based at least in part on the SSB grouping.

In some aspects, an apparatus for wireless communication may include: means for receiving, from another apparatus, a downlink signaling message indicating an SSB grouping based at least in part on a full-duplex capability and transmission directions associated with the other wireless node; and means for performing at least one of a beam search or a self-interference measurement to identify at least one candidate downlink and uplink beam pair suitable for full-duplex operation based at least in part on the SSB grouping.

In some aspects, an apparatus for wireless communication may include: means for transmitting, to another apparatus, a downlink signaling message indicating an SSB grouping based at least in part on a full-duplex capability and transmission directions associated with the apparatus; and means for configuring at least one of a beam search or a self-interference measurement to identify at least one candidate downlink and uplink beam pair suitable for full-duplex operation based at least in part on the SSB grouping.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5C are diagrams illustrating examples of full-duplex communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
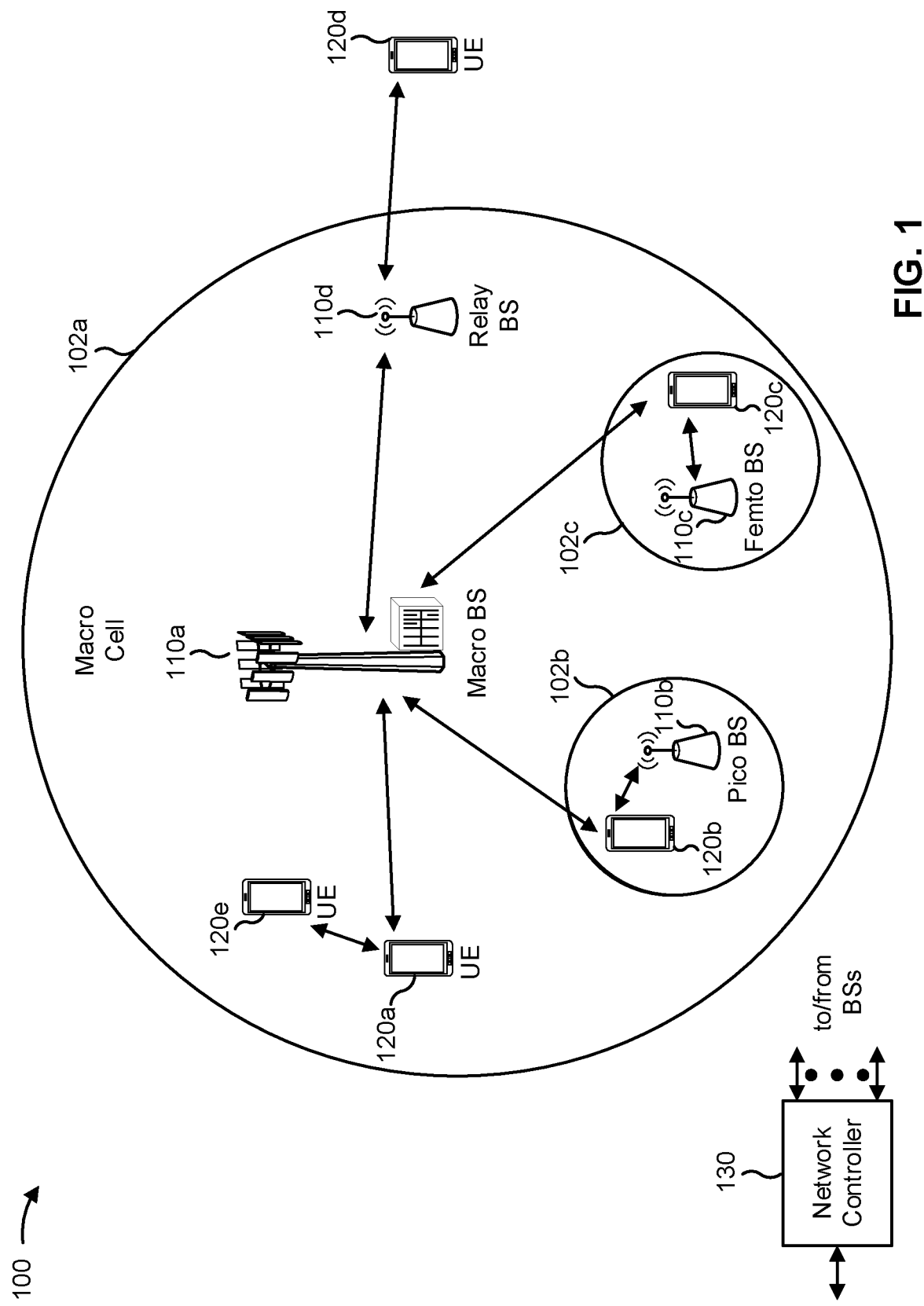
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
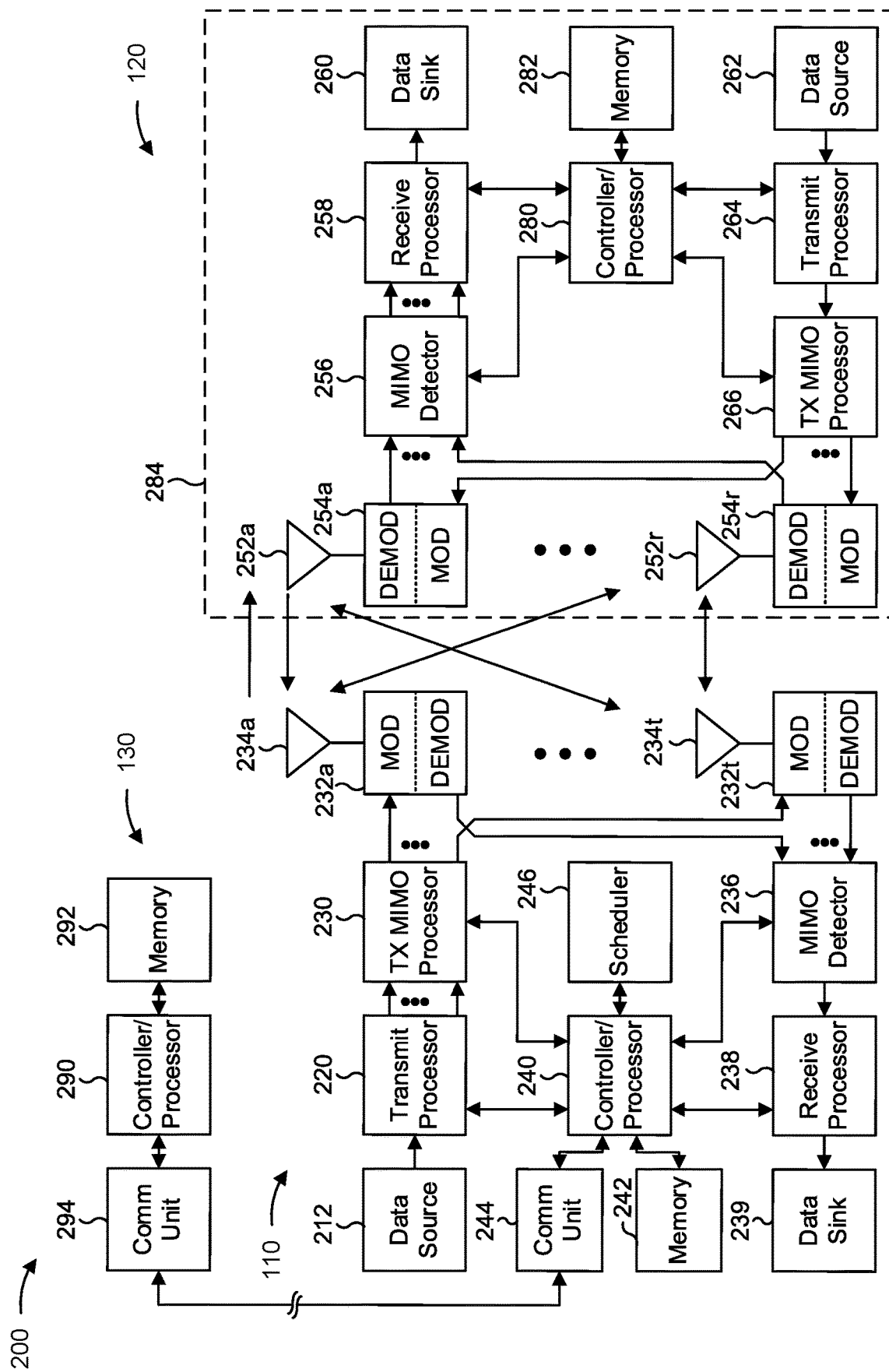
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5A-5C, FIG. 6, FIG. 7, and/or FIG. 8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5A-5C, FIG. 6, FIG. 7, and/or FIG. 8).

Controller/processor 240 of base station 110, controller/processor 280 of UE 120, and/or any other component(s) of FIG. 2 may perform one or more techniques associated with synchronization signal block (SSB) grouping based on a full-duplex capability, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, UE 120 may include means for receiving, from base station 110, a downlink signaling message indicating an SSB grouping based at least in part on a full-duplex capability and transmission directions associated with base station 110, means for performing at least one of a beam search or a self-interference measurement to identify at least one candidate downlink and uplink beam pair suitable for full-duplex operation based at least in part on the SSB grouping, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting, to UE 120, a downlink signaling message indicating an SSB grouping based at least in part on a full-duplex capability and transmission directions associated with base station 110, means for configuring at least one of a beam search or a self-interference measurement to identify at least one candidate downlink and uplink beam pair suitable for full-duplex operation based at least in part on the SSB grouping, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
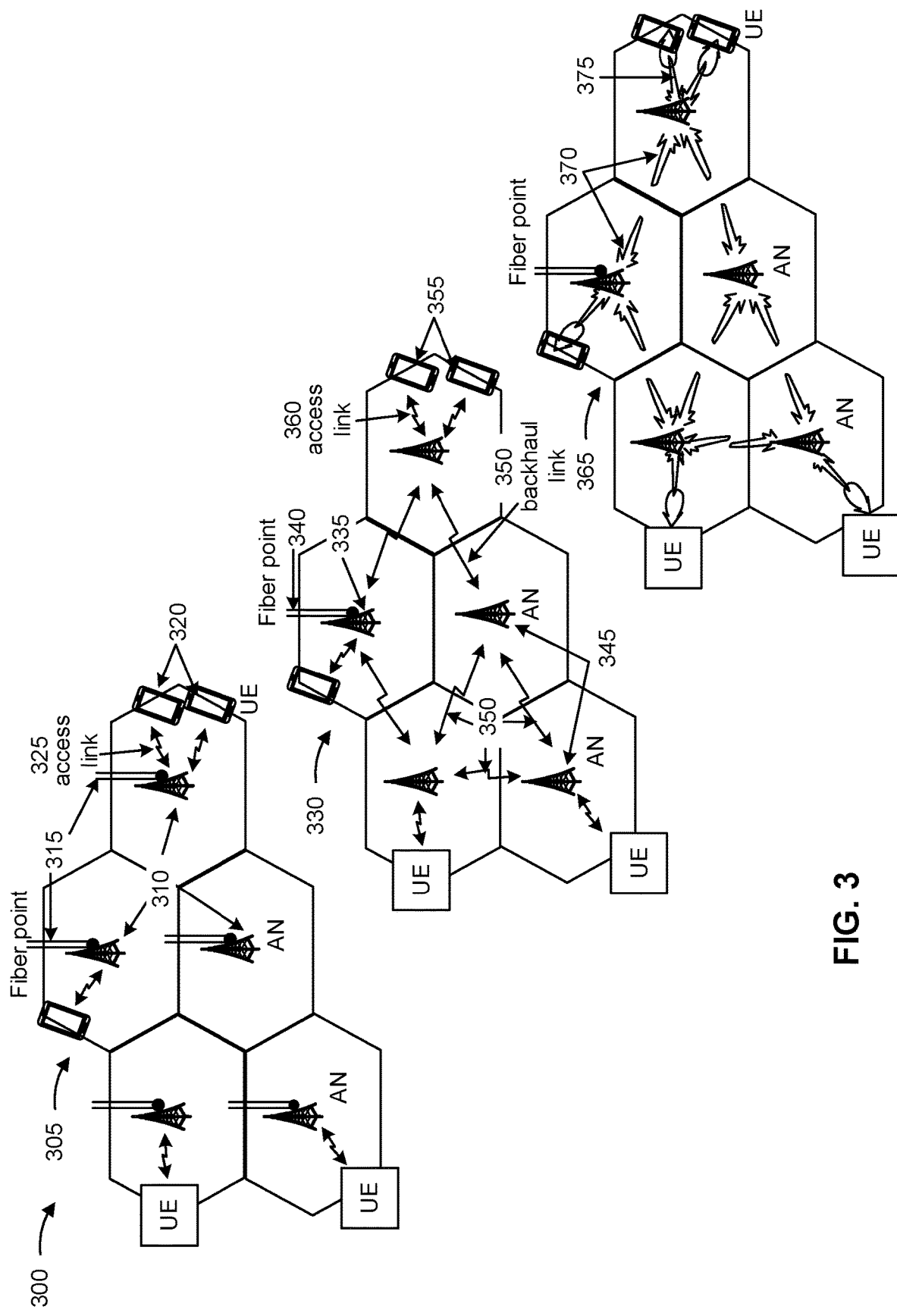
FIG. 3 is a diagram illustrating examples of radio access networks, in accordance with the present disclosure.

FIG. 3 is a diagram illustrating examples 300 of radio access networks, in accordance with the present disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may be a base station 110 shown in FIG. 1. In some aspects, a UE 320 shown in FIG. 3 may be a UE 120 shown in FIG. 1.

As shown by reference number 330, a radio access network may include a wireless backhaul network, sometimes referred to as an integrated access and backhaul (IAB) network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes referred to as relay base stations or IAB nodes (or IAB-nodes). The non-anchor base station 345 may communicate directly or indirectly with the anchor base station 335 via one or more backhaul links 350 (e.g., via one or more non-anchor base stations 345) to form a backhaul path to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may be a base station 110 shown in FIG. 1. In some aspects, a UE 355 shown in FIG. 3 may be a UE 120 shown in FIG. 1.

As shown by reference number 365, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 370 between base stations may use millimeter wave signals to carry information and/or may be directed toward a target base station using beamforming and/or the like. Similarly, the wireless access links 375 between a UE and a base station may use millimeter wave signals and/or may be directed toward a target wireless node (e.g., a UE and/or a base station). In this way, inter-link interference may be reduced.

The configuration of base stations and UEs in FIG. 3 is shown as an example, and other examples are contemplated. For example, one or more base stations illustrated in FIG. 3 may be replaced by one or more UEs that communicate via a UE-to-UE access network (e.g., a peer-to-peer network, a device-to-device network, and/or the like). In this case, a UE that is directly in communication with a base station (e.g., an anchor base station or a non-anchor base station) may be referred to as an anchor node.

As indicated above, FIG. 3 is provided as an example. Other examples may differ from what is described with regard to FIG. 3.

Figure 4:
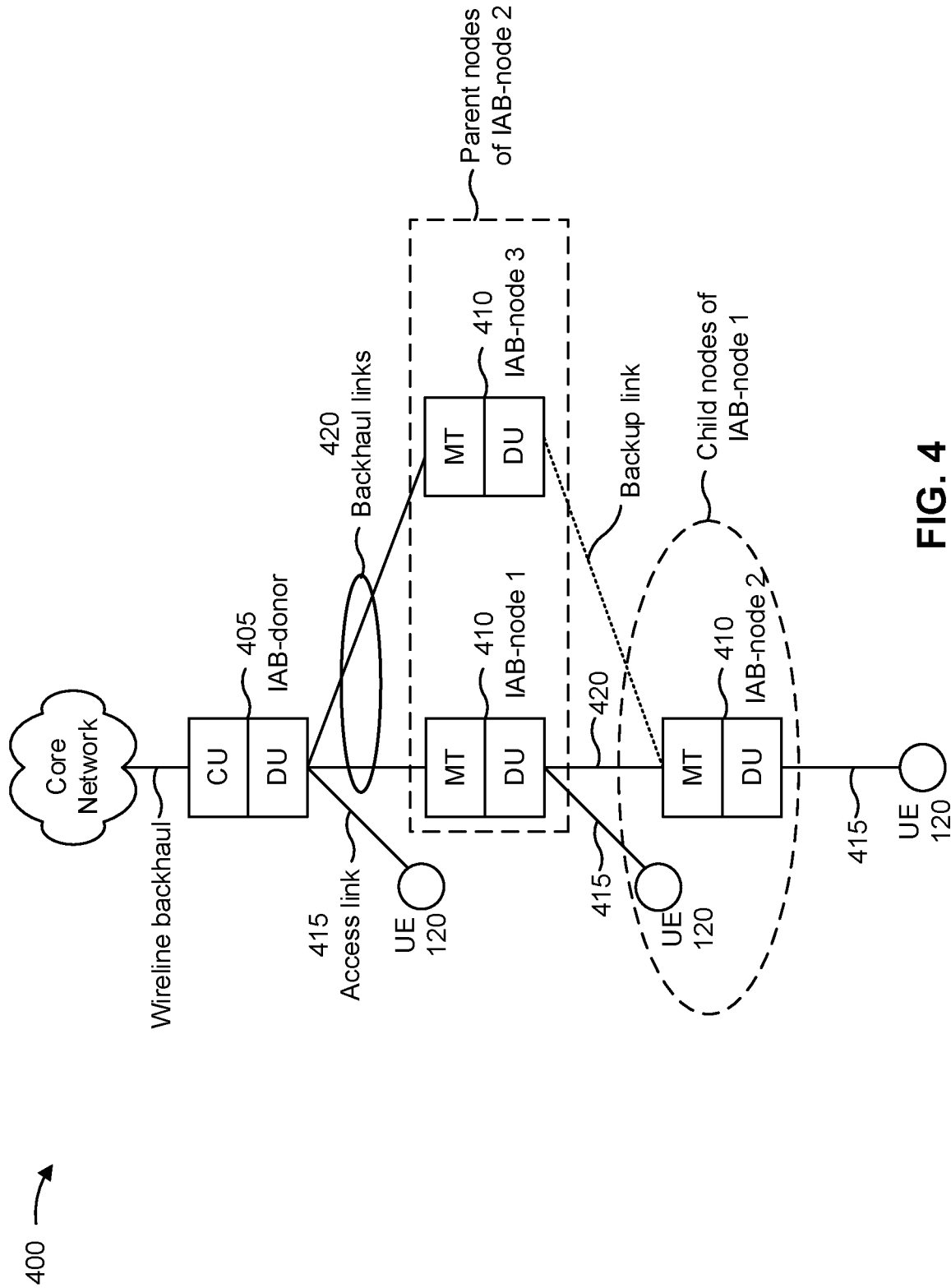
FIG. 4 is a diagram illustrating an example of an integrated access and backhaul network architecture, in accordance with the present disclosure.

FIG. 4 is a diagram illustrating an example 400 of an IAB network architecture, in accordance with the present disclosure.

As shown in FIG. 4, an IAB network may include an IAB donor 405 (shown as IAB-donor) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide a core access and mobility management function (e.g., AMF). In some aspects, an IAB donor 405 may include a base station 110, such as an anchor base station, as described above in connection with 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message, an F1 application protocol (F1AP) message, and/or the like).

As further shown in FIG. 4, the IAB network may include IAB nodes 410 (shown as IAB-node 1, IAB-node 2, and IAB-node 3) that connect to the core network via the IAB donor 405. As shown, an IAB node 410 may include mobile termination (MT) functions (also sometimes referred to as UE functions (UEF)) and may include DU functions (also sometimes referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a multi-hop network or a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In an IAB network, network resources for wireless communications (e.g., time resources, frequency resources, spatial resources, and/or the like) may be shared between access links 415 and backhaul links 420. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. For example, a backup link 425 between IAB-node 2 and IAB-node 3 may be used for backhaul communications if a primary backhaul link between IAB-node 2 and IAB-node 1 fails. As used herein, an IAB donor 405 or an IAB node 410 may be referred to as a node or a wireless node.

As indicated above, FIG. 4 is provided as an example. Other examples may differ from what is described with regard to FIG. 4.

FIGS. 5A-5C are diagrams illustrating examples 500, 510, 520 of full-duplex (FD) communication. As shown in FIGS. 5A-5C, examples 500, 510, 520 include one or more UEs 502 in communication with one or more base stations 504, TRPs 504, and/or the like in a wireless network that supports full-duplex communication. However, it will be appreciated that the devices shown in FIGS. 5A-5C are provided by way of example only, and that the wireless network may support full-duplex communication between other devices (e.g., between a UE and a base station or TRP, between a mobile termination node and a control node, between an IAB child node and an IAB parent node, between a scheduled node and a scheduling node, and/or the like).

As shown in FIG. 5A, example 500 includes a UE 502 in communication with two base stations (e.g., TRPs) 504-1, 504-2. As shown in FIG. 5A, the UE 502 may transmit one or more uplink transmissions to base station 504-1 and may concurrently receive one or more downlink transmission from base station 504-2. Accordingly, in the example 500 shown in FIG. 5A, full-duplex communication is enabled for the UE 502, which may be operating as a full-duplex node, but not for the base stations 504-1, 504-2, which may be operating as half-duplex nodes. Additionally, or alternatively, as shown in FIG. 5B, example 510 includes two UEs, UE1 502-1 and UE2 502-2 in communication with a base station 504. In this case, the base station 504 may transmit one or more downlink transmissions to the UE1 502-1 and may concurrently receive one or more uplink transmissions from the UE2 502-2. Accordingly, in the example 510 shown in FIG. 5B, full-duplex communication is enabled for the base station 504, which may be operating as a full-duplex node, but not for the UE1 502-1 and UE2 502-2, which may be operating as half-duplex nodes. Additionally, or alternatively, as shown in FIG. 5C, example 520 includes a UE 502 in communication with a base station 504. In this case, the base station 504 may transmit, and the UE 502 may receive, one or more downlink transmissions concurrently with the UE 502 transmitting, and the base station 504 receiving, one or more uplink transmissions. Accordingly, in the example 520 shown in FIG. 5C, full-duplex communication is enabled for both the UE 502 and the base station 504, each of which is operating as a full-duplex node.

The present disclosure generally relates to improving the manner in which flexible time-division duplexing (TDD) operates to support full-duplex communication, which generally refers to simultaneous uplink and downlink transmissions in Frequency Range 2 (FR2), in wireless networks that support beamformed communication, and/or the like. In some aspects, flexible TDD capabilities that support full-duplex communication may be present at a scheduling node (e.g., a base station, a TRP, a control node, a parent node, and/or the like), a scheduled node (e.g., a UE, an MT node, a child node, and/or the like), or both. For example, at a UE, uplink transmission may be from one antenna panel and downlink reception may be in another antenna panel. In general, full-duplex communication may be conditional on a beam separation of an uplink beam and a downlink beam at the respective antenna panels. Accordingly, improving the manner in which the uplink beam and the downlink beam are selected to enable full-duplex communication is desirable. Utilizing full-duplex communication may provide reduced latency by allowing a full-duplex node to transmit or receive a downlink signal in an uplink-only slot, or to transmit or receive an uplink signal in a downlink-only slot, which may enable latency savings. In addition, full-duplex communication may enhance spectral efficiency or throughput per cell or per UE, may enable more efficient resource utilization by simultaneously utilizing time and frequency resources for uplink and downlink communication, and/or the like.

As described above, full-duplex communication may be conditional depending on beam separation between uplink and downlink beams to assist in limiting or reducing self-interference that may occur during full-duplex communication. In other words, full-duplex communication may be restricted to not use certain uplink and downlink beam pairs that may result in self-interference, which may occur when a transmitted signal leaks into a receive port, when an object reflects a transmitted signal back to a receive port (e.g., causing a clutter echo effect), and/or the like. Accordingly, whether full-duplex communication can be performed may be dependent on selecting suitable uplink and downlink beam pairs (e.g., transmit and receive beams that are on different antenna panels) to reduce or minimize self-interference (especially clutter echo) via spatial isolation. In some aspects, determining the uplink and downlink beams that are separated on respective antenna panels may provide a reliable full-duplex communication by selecting beam pairs that minimize or reduce self-interference.

Accordingly, measuring self-interference at a wireless node having full-duplex capabilities may assist in determining uplink and downlink beam pairs that may support full-duplex communication. For example, a UE, an IAB child node, and/or the like may obtain self-interference measurements to determine one or more candidate uplink transmit beams that can be paired with one or more candidate downlink receive beams. Additionally, or alternatively, a base station, an IAB parent node, and/or the like may obtain self-interference measurements to determine one or more candidate uplink receive beams that can be paired with one or more candidate downlink transmit beams. In general, to obtain the self-interference measurements, a wireless node with full-duplex capabilities may transmit a signal from a first set of antennas in one or more transmit beam directions, and the wireless node may concurrently measure a received signal (e.g., a reflected or leaked transmit signal) on a second set of antennas in one or more receive beam directions, where the first set of antennas may be different from or the same as the second set of antennas.

Some aspects described herein relate to techniques and apparatuses that may divide or otherwise partition synchronization signal blocks (SSBs) transmitted by a first wireless node (e.g., a base station, a control node, a parent node, a scheduling node, and/or the like) into groups to enable the first wireless node and a second wireless node (e.g., a UE, an MT node, a child node, a scheduled node, and/or the like) to determine one or more downlink and/or uplink beams that may be suitable for full-duplex operation. For example, the first wireless node may perform a self-interference measurement to determine whether an SSB beam transmitted in a particular direction can potentially be configured for full-duplex operation, is unsuitable for full-duplex operation, and/or the like. Furthermore, in some cases, one or more SSB beams that are potentially suitable for full-duplex operation may be limited to a particular direction (e.g., downlink transmission only, uplink reception only, and/or the like). Accordingly, the first wireless node may transmit, to the second wireless node, a downlink signaling message that indicates an SSB grouping based at least in part on full-duplex capabilities in various transmission directions. The first wireless node and the second wireless node may then communicate to refine one or more uplink and/or downlink beams to be used for communication between the first wireless node and the second wireless node (e.g., based at least in part on a beam sweep and a corresponding beam search, one or more self-interference measurements, and/or the like). In this way, the SSB grouping may enable the first wireless node and the second wireless node to identify candidate beams that may potentially enable full-duplex operation, which can reduce communication latency, enhance spectral efficiency or throughput, enable more efficient resource utilization, and/or the like. Furthermore, grouping SSBs according to full-duplex capabilities may enable a more efficient beam search and/or self-interference measurement(s) than performing a beam search and/or self-interference measurement(s) for all SSB beams transmitted by the first wireless node.

As indicated above, FIGS. 5A-5C are provided as one or more examples. Other examples may differ from what is described with regard to FIGS. 5A-5C.

Figure 6:
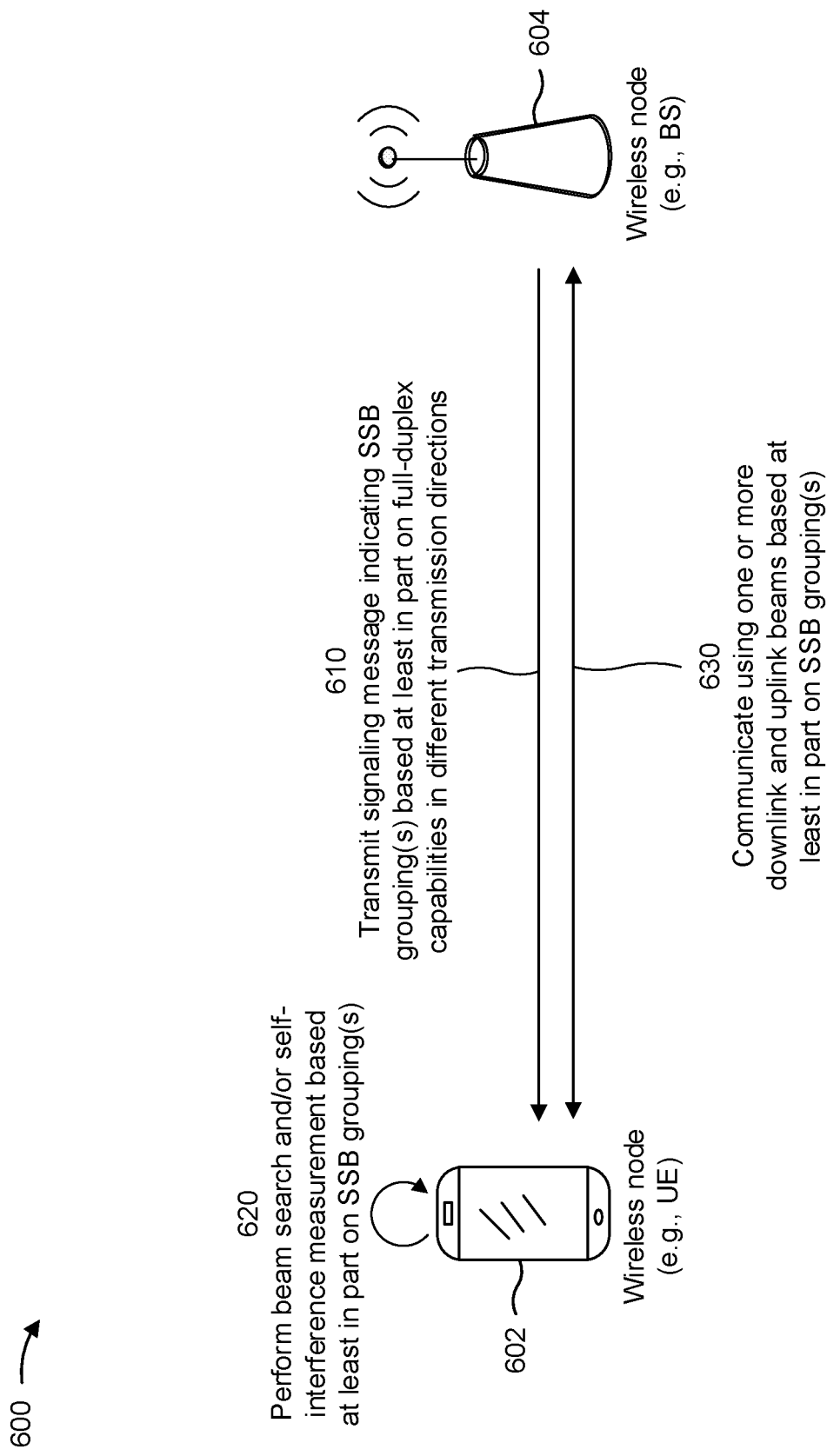
FIG. 6 is a diagram illustrating one or more examples associated with synchronization signal block (SSB) grouping based on a full-duplex capability, in accordance with the present disclosure.

FIG. 6 is a diagram illustrating one or more examples 600 associated with associated with an enhanced measurement and report configuration for full-duplex operation, in accordance with the present disclosure. As shown in FIG. 6, example(s) 600 includes a first wireless node 602 in communication with a second wireless node 604 in a wireless network (e.g., wireless network 100, radio access network 305, 330, 365, and/or the like). In some aspects, as shown in FIG. 6, the wireless node 602 may be a UE (e.g., UE 120, 502, and/or the like) and the wireless node 604 may be a base station (e.g., base station 110, 504, and/or the like). Additionally, or alternatively, in some aspects, the wireless nodes may correspond to other suitable devices that can communicate on an uplink and a downlink (e.g., the wireless node 602 may correspond to an IAB node, a child node, a scheduled node, and/or the like, and the wireless node 604 may correspond to a control node, a parent node, a scheduling node, and/or the like).

In some aspects, as described herein, the wireless nodes 602, 604 may communicate with one another using beams and the wireless nodes 602, 604 may have full-duplex communication capabilities. For example, as described above, the wireless nodes 602, 604 may communicate in a wireless network that supports flexible time-division duplexing (TDD) with full-duplex communication, which generally refers to simultaneous uplink and downlink transmissions. However, as described above, full-duplex communication may be conditional on a beam separation (e.g., spatial isolation) between an uplink beam and a downlink beam at respective antenna panels. Accordingly, as described herein, the wireless nodes 602, 604 may utilize one or more SSB groupings that relate to a full-duplex capability of the wireless node 604 in various transmission directions to identify candidate downlink beams and/or candidate uplink beams that may provide sufficient beam separation to enable full-duplex communication. The SSB grouping(s) may be used to identify candidate beams that may be suitable (or unsuitable) for use as an uplink beam and/or a downlink beam in full-duplex operation. For example, an SSB group may include one or more SSB beams that may be suitable for use as an uplink beam only or a downlink beam only. In another example, an SSB group may include one or more SSB beams that may be suitable for both transmission directions (e.g., for use either as an uplink beam or a downlink beam).

For example, as shown in FIG. 6, and by reference number 610, the wireless node 604 may transmit, and the wireless node 602 may receive, a downlink signaling message that indicates one or more SSB groupings based at least in part on full-duplex capabilities of the wireless node 604 in different transmission directions. For example, the wireless node 604 may be configured to transmit multiple SSBs in one or more beam sweeps to cover a spatial area (e.g., a coverage area associated with a cell provided by the wireless node 604). Accordingly, each SSB may be beam-formed differently (e.g., transmitted in different spatial directions using different beams), and may be used for beam management, beam selection, and/or the like (e.g., as part of an initial network access procedure). In some aspects, an SSB may include an SSB index, which may correspond to a beam used to carry the SSB. Accordingly, the wireless node 602 may monitor for and/or measure SSBs transmitted by the wireless node 604 using different downlink receive (Rx) beams during an initial network access procedure, and may indicate the SSB indexes associated with one or more SSBs with a best signal parameter (e.g., a reference signal received power (RSRP) parameter and/or the like) to the wireless node 604. The wireless nodes 602, 604 may then use the one or more indicated SSBs to select one or more beams to be used for communication between the wireless nodes 602, 604 (e.g., for a random access channel (RACH) procedure). Furthermore, as described herein, the wireless node 604 may determine and indicate one or more SSB groupings in the downlink signaling message to potentially enable full-duplex communication between the wireless nodes 602, 604.

For example, in some aspects, the downlink signaling message indicating the SSB groupings may include a master information block (MIB), a remaining minimum system information (RMSI) message, a radio resource control (RRC) message, and/or the like. In some aspects, the wireless node 604 may determine a full-duplex capability for each SSB beam that the wireless node 604 is configured to transmit, and may group the SSB beams according to the full-capability associated with the various SSB beams. For example, in some aspects, the wireless node 604 may perform one or more self-interference measurements to determine whether a particular SSB beam transmitted in a particular direction can be full-duplexed at the wireless node 604. For example, while transmitting an SSB beam using a first antenna panel or a first set of antennas, the wireless node 604 may measure a received signal that corresponds to a leaked transmit signal, a reflected transmit signal, and/or the like at a second antenna panel or a second set of antennas. Accordingly, in some aspects, whether a first SSB beam can be full-duplexed (e.g., paired with a second SSB beam in full-duplex operation) may depend on whether the first SSB causes a threshold level of self-interference at the wireless node 604. Additionally, or alternatively, whether a particular SSB beam can be full-duplexed at the wireless node 604 may depend on changing channel conditions, link budgets, available transmit or receive power, relative position, geographic features or multi-path characteristics (e.g., reflectors or other objects), and/or the like.

Accordingly, in some aspects, the downlink signaling message transmitted to the wireless node 602 may include one or more SSB groupings to indicate pairs of SSB beams that are potentially suitable for full-duplex operation at the wireless node 604. For example, in an SSB beam pair that can potentially be full-duplexed at the wireless node 604, a first beam may be configured as a downlink transmit beam and a second beam may be configured as an uplink receive beam. Additionally, or alternatively, the one or more SSB groupings may indicate one or more SSB beams or SSB beam pairs that are unsuitable for full-duplex operation at the wireless node 604 (e.g., based on static or dynamic full-duplex capabilities of the wireless node 604, self-interference measurements associated with the SSB beams or SSB beam pairs, and/or the like). Furthermore, in some aspects, the downlink signaling message may include panel identifiers, TRP identifiers, and/or other suitable information such that the wireless node 602 cam identify SSB beams that are associated with different antenna panels in order to ensure that beams used for transmission and reception are spatially isolated.

Additionally, or alternatively, in some aspects, the one or more SSB groupings may indicate one or more SSB beams that are suitable for use in certain transmission directions. For example, one or more SSB beams may potentially be suitable for full-duplex operation, but only in an uplink direction or only in a downlink direction, while other SSB beams may potentially be suitable to configure for either the uplink or the downlink direction. For example, a particular SSB beam may be limited to the uplink direction only or the downlink direction only due to a pre-configured implementation or capability of the wireless node 604, due to dynamic scheduling information associated with the SSB beam (e.g., where downlink resources are fully occupied such that the wireless node 604 can only receive via the corresponding beam), and/or the like. Accordingly, in some aspects, different SSB groupings may indicate SSB beams that are candidate full-duplex beams suitable for the downlink direction only, SSB beams that are candidate full-duplex beams suitable for the uplink direction only, SSB beams that are candidate full-duplex beams suitable for either the downlink direction or the uplink direction, SSB beams that cannot be configured for full-duplex operation, and/or the like.

As further shown in FIG. 6, and by reference number 620, the wireless node 602 may perform a beam search and/or a self-interference measurement based at least in part on the SSB grouping(s) indicated in the downlink signaling message. For example, in some aspects, the wireless node 604 may configure the beam search and/or the self-interference measurement to determine whether there are one or more candidate downlink and uplink beam pairs that may be suitable to enable full-duplex communication between the wireless nodes 602, 604. For example, the wireless node 604 may perform one or more beam sweeps using SSB beams that are potential full-duplex candidates, and the wireless node 602 may perform a receive beam search to identify one or more corresponding beams that may be candidates to be paired with the SSB beams for full-duplex operation. For example, in order to enable full-duplex communication between the wireless nodes 602, 604, the wireless nodes 602, 604 may generally determine one or more downlink transmit beams at the wireless node 604 that can be paired with one or more downlink receive beams at the wireless node 602 in addition to one or more uplink receive beams at the wireless node 604 that can be paired with one or more uplink transmit beams at the wireless node 602. Accordingly, the beam sweep and the corresponding beam search may be performed by the wireless node 604 and the wireless node 602, respectively, in order to identify such candidate downlink and uplink beam pairings. In cases where one or more candidate downlink and uplink beam pairings are identified based at least in part on the SSB groupings indicated by the wireless node 604, the wireless node 602 may further perform self-interference measurements to determine whether a candidate uplink transmit beam is sufficiently spatially isolated from a candidate downlink receive beam to be paired with the candidate uplink transmit beam in full-duplex operation.

Accordingly, as further shown in FIG. 6, and by reference number 630, the wireless nodes 602, 604 may communicate using one or more downlink and uplink beams based at least in part on the SSB groupings indicated in the downlink signaling message. For example, in some aspects, the wireless nodes 602, 604 may attempt to identify one or more downlink and uplink beam pairs that can be full-duplexed based on the SSB beam pairs that are potentially suitable for full-duplex operation, the SSB beams that are suitable for communication in the uplink direction and/or the downlink direction, and/or the like. In cases where the wireless node 602 can communicate using an uplink and downlink beam pair that corresponds to a suitable (e.g., full-duplex capable) uplink and downlink beam pair at the wireless node 604 and satisfies a self-interference measurement threshold, full-duplex communications may be enabled between the wireless nodes 602, 604. Otherwise, the wireless nodes 602, 604 may communicate in a half-duplex mode (e.g., according to a TDD configuration in which each symbol or slot is uplink or downlink only).

As indicated above, FIG. 6 is provided as one or more examples. Other examples may differ from what is described with respect to FIG. 6.

Figure 7:
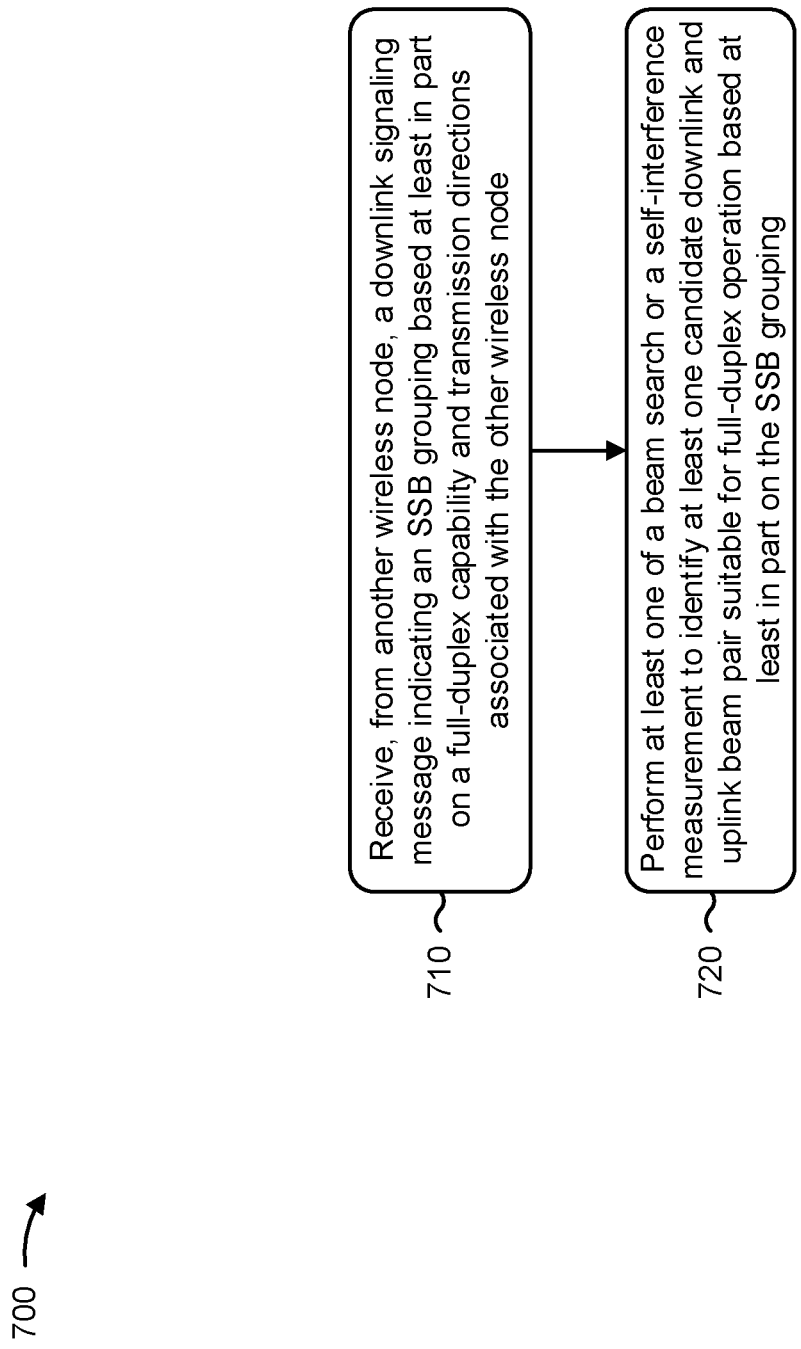
FIGS. 7-8 are diagrams illustrating example processes associated with SSB grouping based on a full-duplex capability, in accordance with the present disclosure.

FIG. 7 is a diagram illustrating an example process 700 performed, for example, by a wireless node, in accordance with the present disclosure. Example process 700 is an example where the wireless node (e.g., UE 120, IAB node 410, an IAB child node, UE 502, a scheduled node, wireless node 602, and/or the like) performs operations associated with an SSB grouping based on a full-duplex capability.

As shown in FIG. 7, in some aspects, process 700 may include receiving, from another wireless node, a downlink signaling message indicating an SSB grouping based at least in part on a full-duplex capability and transmission directions associated with the other wireless node (block 710). For example, the wireless node may receive (e.g., using antenna 252, DEMOD 254, MIMO detector 256, receive processor 258, controller/processor 280, memory 282, and/or the like), from another wireless node, a downlink signaling message indicating an SSB grouping based at least in part on a full-duplex capability and transmission directions associated with the other wireless node, as described above.

As further shown in FIG. 7, in some aspects, process 700 may include performing at least one of a beam search or a self-interference measurement to identify at least one candidate downlink and uplink beam pair suitable for full-duplex operation based at least in part on the SSB grouping (block 720). For example, the wireless node may perform (e.g., using antenna 252, DEMOD 254, MIMO detector 256, receive processor 258, controller/processor 280, memory 282, transmit processor 264, TX MIMO processor 266, MOD 254, antenna 252, and/or the like) at least one of a beam search or a self-interference measurement to identify at least one candidate downlink and uplink beam pair suitable for full-duplex operation based at least in part on the SSB grouping, as described above.

Process 700 may include additional aspects, such as any single aspect or any combination of aspects described below and/or in connection with one or more other processes described elsewhere herein.

In a first aspect, the downlink signaling message indicating the SSB grouping includes one or more of a MIB, a RMSI message, or an RRC message.

In a second aspect, alone or in combination with the first aspect, the SSB grouping indicates one or more SSB beams that correspond to one or more candidate downlink transmit beams or candidate uplink receive beams suitable for full-duplex operation at the other wireless node.

In a third aspect, alone or in combination with one or more of the first and second aspects, the SSB grouping indicates one or more SSB beams that correspond to one or more candidate downlink transmit beams or candidate uplink receive beams that are unsuitable for full-duplex operation at the other wireless node.

In a fourth aspect, alone or in combination with one or more of the first through third aspects, the SSB grouping indicates one or more SSB beams that are limited to only a downlink direction or only an uplink direction.

In a fifth aspect, alone or in combination with one or more of the first through fourth aspects, the one or more SSB beams that are limited to only the downlink direction or only the uplink direction are based at least in part on the full-duplex capability associated with the other wireless node.

In a sixth aspect, alone or in combination with one or more of the first through fifth aspects, the one or more SSB beams that are limited to only the downlink direction or only the uplink direction are based at least in part on dynamic scheduling information associated with the other wireless node.

In a seventh aspect, alone or in combination with one or more of the first through sixth aspects, the wireless node includes a UE, an IAB node, a child node, a scheduled node, and/or the like, and the other wireless node includes a base station, a control node, a parent node, a scheduling node, and/or the like.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
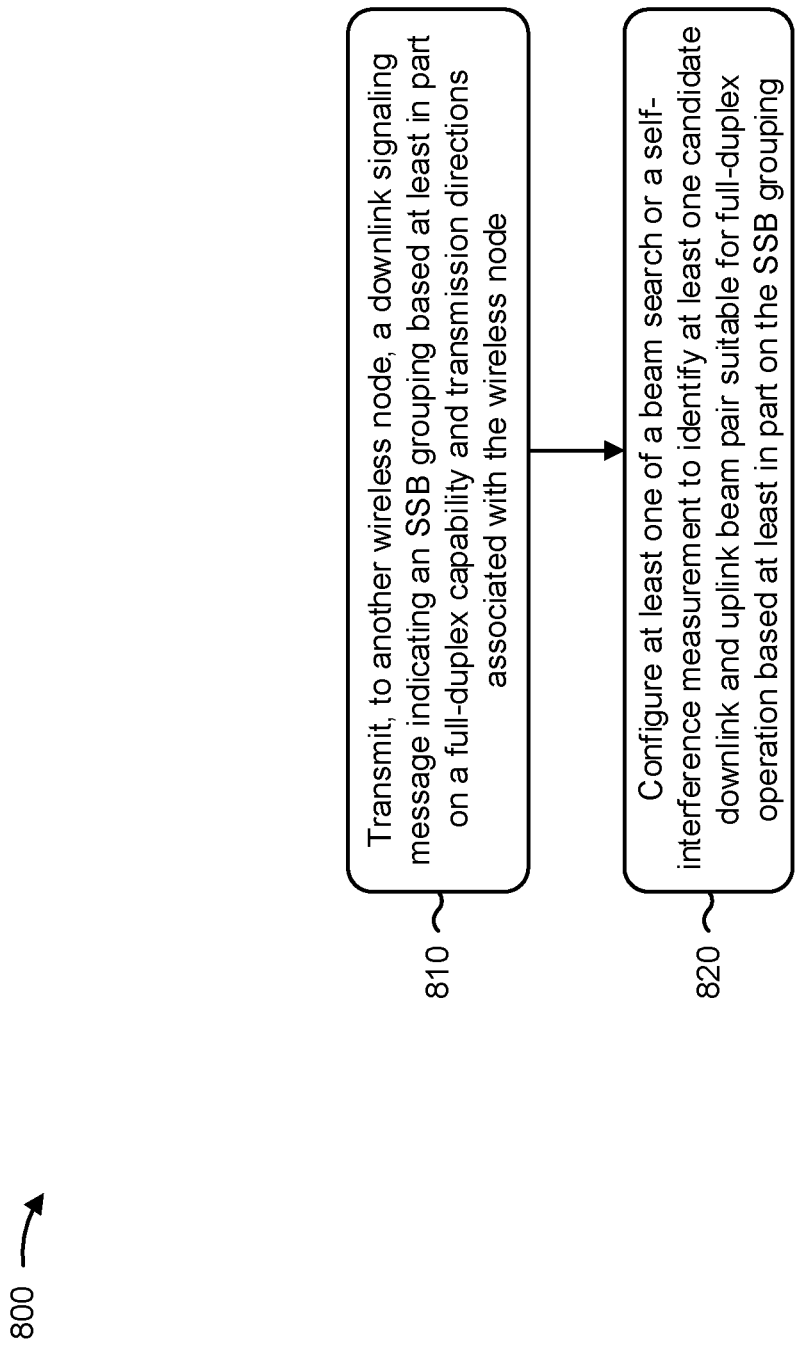

FIG. 8 is a diagram illustrating an example process 800 performed, for example, by a wireless node, in accordance with the present disclosure. Example process 800 is an example where the wireless node (e.g., base station 110, IAB node 410, an TAB parent node, base station or TRP 504, a scheduling node, wireless node 604, and/or the like) performs operations associated with an SSB grouping based on a full-duplex capability.

As shown in FIG. 8, in some aspects, process 800 may include transmitting, to another wireless node, a downlink signaling message indicating an SSB grouping based at least in part on a full-duplex capability and transmission directions associated with the wireless node (block 810). For example, the wireless node may transmit (e.g., using controller/processor 240, transmit processor 220, TX MIMO processor 230, MOD 232, antenna 234, memory 242, and/or the like), to another wireless node, a downlink signaling message indicating an SSB grouping based at least in part on a full-duplex capability and transmission directions associated with the wireless node, as described above.

As further shown in FIG. 8, in some aspects, process 800 may include configuring at least one of a beam search or a self-interference measurement to identify at least one candidate downlink and uplink beam pair suitable for full-duplex operation based at least in part on the SSB grouping (block 820). For example, the wireless node may configure (e.g., using antenna 234, DEMOD 232, MIMO detector 236, receive processor 238, controller/processor 240, memory 242, transmit processor 220, TX MIMO processor 230, MOD 232, antenna 234, and/or the like) at least one of a beam search or a self-interference measurement to identify at least one candidate downlink and uplink beam pair suitable for full-duplex operation based at least in part on the SSB grouping, as described above.

Process 800 may include additional aspects, such as any single aspect or any combination of aspects described below and/or in connection with one or more other processes described elsewhere herein.

In a first aspect, the downlink signaling message indicating the SSB grouping includes one or more of a MIB, a RMSI message, or an RRC message.

In a second aspect, alone or in combination with the first aspect, the SSB grouping indicates one or more SSB beams that correspond to one or more candidate downlink transmit beams or candidate uplink receive beams suitable for full-duplex operation at the wireless node.

In a third aspect, alone or in combination with one or more of the first and second aspects, the SSB grouping indicates one or more SSB beams that correspond to one or more candidate downlink transmit beams or candidate uplink receive beams that are unsuitable for full-duplex operation at the wireless node.

In a fourth aspect, alone or in combination with one or more of the first through third aspects, the SSB grouping indicates one or more SSB beams that are limited to only a downlink direction or only an uplink direction.

In a fifth aspect, alone or in combination with one or more of the first through fourth aspects, the one or more SSB beams that are limited to only the downlink direction or only the uplink direction are based at least in part on the full-duplex capability associated with the wireless node.

In a sixth aspect, alone or in combination with one or more of the first through fifth aspects, the one or more SSB beams that are limited to only the downlink direction or only the uplink direction are based at least in part on dynamic scheduling information associated with the wireless node.

In a seventh aspect, alone or in combination with one or more of the first through sixth aspects, the wireless node includes a base station, a control node, a parent node, a scheduling node, and/or the like, and the other wireless node includes a UE, an IAB node, a child node, a scheduled node, and/or the like.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a wireless node, comprising: receiving, from another wireless node, a downlink signaling message indicating an SSB grouping based at least in part on a full-duplex capability and transmission directions associated with the other wireless node; and performing at least one of a beam search or a self-interference measurement to identify at least one candidate downlink and uplink beam pair suitable for full-duplex operation based at least in part on the SSB grouping.

Aspect 2: The method of Aspect 1, wherein the downlink signaling message indicating the SSB grouping includes one or more of a MIB, an RMSI message, or an RRC message.

Aspect 3: The method of any of Aspects 1-2, wherein the SSB grouping indicates one or more SSB beams that correspond to one or more candidate downlink transmit beams or candidate uplink receive beams suitable for full-duplex operation at the other wireless node.

Aspect 4: The method of any of Aspects 1-3, wherein the SSB grouping indicates one or more SSB beams that correspond to one or more candidate downlink transmit beams or candidate uplink receive beams that are unsuitable for full-duplex operation at the other wireless node.

Aspect 5: The method of any of Aspects 1-4, wherein the SSB grouping indicates one or more SSB beams that are limited to only a downlink direction or only an uplink direction.

Aspect 6: The method of Aspect 5, wherein the one or more SSB beams that are limited to only the downlink direction or only the uplink direction are based at least in part on the full-duplex capability associated with the other wireless node.

Aspect 7: The method of any of Aspects 5-6, wherein the one or more SSB beams that are limited to only the downlink direction or only the uplink direction are based at least in part on dynamic scheduling information associated with the other wireless node.

Aspect 8: The method of any of Aspects 1-7, wherein the wireless node includes one or more of a UE, an IAB node, a child node, or a scheduled node, and wherein the other wireless node includes one or more of a base station, a control node, a parent node, or a scheduling node.

Aspect 9: A method of wireless communication performed by a wireless node, comprising: transmitting, to another wireless node, a downlink signaling message indicating an SSB grouping based at least in part on a full-duplex capability and transmission directions associated with the wireless node; and configuring at least one of a beam search or a self-interference measurement to identify at least one candidate downlink and uplink beam pair suitable for full-duplex operation based at least in part on the SSB grouping.

Aspect 10: The method of Aspect 9, wherein the downlink signaling message indicating the SSB grouping includes one or more of a MIB, an RMSI message, or an RRC message.

Aspect 11: The method of any of Aspects 9-10, wherein the SSB grouping indicates one or more SSB beams that correspond to one or more candidate downlink transmit beams or candidate uplink receive beams suitable for full-duplex operation at the wireless node.

Aspect 12: The method of any of Aspects 9-11, wherein the SSB grouping indicates one or more SSB beams that correspond to one or more candidate downlink transmit beams or candidate uplink receive beams that are unsuitable for full-duplex operation at the wireless node.

Aspect 13: The method of any of Aspects 9-12, wherein the SSB grouping indicates one or more SSB beams that are limited to only a downlink direction or only an uplink direction.

Aspect 14: The method of Aspect 13, wherein the one or more SSB beams that are limited to only the downlink direction or only the uplink direction are based at least in part on the full-duplex capability associated with the wireless node.

Aspect 15: The method of any of Aspects 13-14, wherein the one or more SSB beams that are limited to only the downlink direction or only the uplink direction are based at least in part on dynamic scheduling information associated with the wireless node.

Aspect 16: The method of any of Aspects 9-15, wherein the wireless node includes one or more of a base station, a control node, a parent node, or a scheduling node, and wherein the other wireless node includes one or more of a UE, an IAB node, a child node, or a scheduled node.

Aspect 17: An apparatus for wireless communication at a device, comprising a processor; memory coupled with the processor; and instructions stored in the memory and executable by the processor to cause the apparatus to perform the method of any of Aspects 1-8.

Aspect 18: A device for wireless communication, comprising a memory and one or more processors coupled to the memory, the memory and the one or more processors configured to perform the method of any of Aspects 1-8.

Aspect 19: An apparatus for wireless communication, comprising at least one means for performing the method of any of Aspects 1-8.

Aspect 20: A non-transitory computer-readable medium storing code for wireless communication, the code comprising instructions executable by a processor to perform the method of any of Aspects 1-8.

Aspect 21: A non-transitory computer-readable medium storing a set of instructions for wireless communication, the set of instructions comprising one or more instructions that, when executed by one or more processors of a device, cause the device to perform the method of any of Aspects 1-8.

Aspect 22: An apparatus for wireless communication at a device, comprising a processor; memory coupled with the processor; and instructions stored in the memory and executable by the processor to cause the apparatus to perform the method of any of Aspects 9-16.

Aspect 23: A device for wireless communication, comprising a memory and one or more processors coupled to the memory, the memory and the one or more processors configured to perform the method of any of Aspects 9-16.

Aspect 24: An apparatus for wireless communication, comprising at least one means for performing the method of any of Aspects 9-16.

Aspect 25: A non-transitory computer-readable medium storing code for wireless communication, the code comprising instructions executable by a processor to perform the method of any of Aspects 9-16.

Aspect 26: A non-transitory computer-readable medium storing a set of instructions for wireless communication, the set of instructions comprising one or more instructions that, when executed by one or more processors of a device, cause the device to perform the method of any of Aspects 9-16.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a wireless node, comprising:
   receiving, from another wireless node, a downlink signaling message indicating a synchronization signal block (SSB) grouping based at least in part on a full-duplex capability and transmission directions associated with the other wireless node, wherein the SSB grouping indicates one or more SSB beams;
   performing a beam search to identify one or more candidate beams to be paired with the one or more SSB beams for full-duplex operation; and
   performing a self-interference measurement to determine whether a candidate uplink transmit beam is sufficiently spatially isolated from a candidate downlink receive beam to be paired with the candidate uplink transmit beam in the full-duplex operation.

2. The method of claim 1, wherein the downlink signaling message indicating the SSB grouping includes one or more of a master information block, a remaining minimum system information message, or a radio resource control message.

3. The method of claim 1, wherein the one or more SSB beams correspond to one or more candidate downlink transmit beams or candidate uplink receive beams suitable for full-duplex operation at the other wireless node.

4. The method of claim 1, wherein the one or more SSB beams correspond to one or more candidate downlink transmit beams or candidate uplink receive beams that are unsuitable for full-duplex operation at the other wireless node.

5. The method of claim 1, wherein the one or more SSB beams are limited to only a downlink direction or only an uplink direction.

6. The method of claim 5, wherein the one or more SSB beams that are limited to only the downlink direction or only the uplink direction are based at least in part on the full-duplex capability associated with the other wireless node.

7. The method of claim 5, wherein the one or more SSB beams that are limited to only the downlink direction or only the uplink direction are based at least in part on dynamic scheduling information associated with the other wireless node.

8. The method of claim 1, wherein the wireless node includes one or more of a user equipment, an integrated access and backhaul node, a child node, or a scheduled node, and wherein the other wireless node includes one or more of a network entity, a control node, a parent node, or a scheduling node.

9. A method of wireless communication performed by a wireless node, comprising:
   transmitting, to another wireless node, a downlink signaling message indicating a synchronization signal block (SSB) grouping based at least in part on a full-duplex capability and transmission directions associated with the wireless node, wherein the SSB grouping indicates one or more SSB beams;
   configuring a beam search to identify one or more candidate beams to be paired with the one or more SSB beams for full-duplex operation; and
   configuring a self-interference measurement to determine whether a candidate uplink transmit beam is sufficiently spatially isolated from a candidate downlink receive beam to be paired with the candidate uplink transmit beam in the full-duplex operation.

10. The method of claim 9, wherein the downlink signaling message indicating the SSB grouping includes one or more of a master information block, a remaining minimum system information message, or a radio resource control message.

11. The method of claim 9, wherein the SSB grouping indicates one or more SSB beams correspond to one or more candidate downlink transmit beams or candidate uplink receive beams suitable for full-duplex operation at the wireless node.

12. The method of claim 9, wherein the SSB grouping indicates one or more SSB beams correspond to one or more candidate downlink transmit beams or candidate uplink receive beams that are unsuitable for full-duplex operation at the wireless node.

13. The method of claim 9, wherein the SSB grouping indicates one or more SSB beams are limited to only a downlink direction or only an uplink direction.

14. The method of claim 13, wherein the one or more SSB beams that are limited to only the downlink direction or only the uplink direction are based at least in part on the full-duplex capability associated with the wireless node in the downlink direction or in the uplink direction.

15. The method of claim 13, wherein the one or more SSB beams that are limited to only the downlink direction or only the uplink direction are based at least in part on dynamic scheduling information associated with the wireless node.

16. The method of claim 9, wherein the wireless node includes one or more of a network entity, a control node, a parent node, or a scheduling node, and wherein the other wireless node includes one or more of a user equipment, an integrated access and backhaul node, a child node, or a scheduled node.

17. A wireless node for wireless communication, comprising:
a memory; and
one or more processors coupled to the memory, the one or more processors configured to:
receive, from another wireless node, a downlink signaling message indicating a synchronization signal block (SSB) grouping based at least in part on a full-duplex capability and transmission directions associated with the other wireless node, wherein the SSB grouping indicates one or more SSB beams;
perform a beam search to identify one or more candidate beams to be paired with the one or more SSB beams for full-duplex operation; and
perform a self-interference measurement to determine whether a candidate uplink transmit beam is sufficiently spatially isolated from a candidate downlink receive beam to be paired with the candidate uplink transmit beam in the full-duplex operation.

18. The wireless node of claim 17, wherein the downlink signaling message indicating the SSB grouping includes one or more of a master information block, a remaining minimum system information message, or a radio resource control message.

19. The wireless node of claim 17, wherein the one or more SSB beams correspond to one or more candidate downlink transmit beams or candidate uplink receive beams suitable for full-duplex operation at the other wireless node.

20. The wireless node of claim 17, wherein the one or more SSB beams correspond to one or more candidate downlink transmit beams or candidate uplink receive beams that are unsuitable for full-duplex operation at the other wireless node.

21. The wireless node of claim 17, wherein the one or more SSB beams are limited to only a downlink direction or only an uplink direction.

22. The wireless node of claim 21, wherein the one or more SSB beams that are limited to only the downlink direction or only the uplink direction are based at least in part on the full-duplex capability associated with the other wireless node.

23. The wireless node of claim 21, wherein the one or more SSB beams that are limited to only the downlink direction or only the uplink direction are based at least in part on dynamic scheduling information associated with the other wireless node.

24. A wireless node for wireless communication, comprising:
a memory; and
one or more processors coupled to the memory, the one or more processors configured to:
transmit, to another wireless node, a downlink signaling message indicating a synchronization signal block (SSB) grouping based at least in part on a full-duplex capability and transmission directions associated with the wireless node, wherein the SSB grouping indicates one or more SSB beams;
configure a beam search to identify one or more candidate beams to be paired with the one or more SSB beams for full-duplex operation; and
configure a self-interference measurement to determine whether a candidate uplink transmit beam is sufficiently spatially isolated from a candidate downlink receive beam to be paired with the candidate uplink transmit beam in the full-duplex operation.

25. The wireless node of claim 24, wherein the downlink signaling message indicating the SSB grouping includes one or more of a master information block, a remaining minimum system information message, or a radio resource control message.

26. The wireless node of claim 24, wherein the one or more SSB beams correspond to one or more candidate downlink transmit beams or candidate uplink receive beams suitable for full-duplex operation at the wireless node.

27. The wireless node of claim 24, wherein the one or more SSB beams correspond to one or more candidate downlink transmit beams or candidate uplink receive beams that are unsuitable for full-duplex operation at the wireless node.

28. The wireless node of claim 24, wherein the one or more SSB beams are limited to only a downlink direction or only an uplink direction.

29. The wireless node of claim 28, wherein the one or more SSB beams that are limited to only the downlink direction or only the uplink direction are based at least in part on the full-duplex capability associated with the wireless node in the downlink direction or in the uplink direction.

30. The wireless node of claim 28, wherein the one or more SSB beams that are limited to only the downlink direction or only the uplink direction are based at least in part on dynamic scheduling information associated with the wireless node.

* * * * *